Patented Sept. 3, 1940

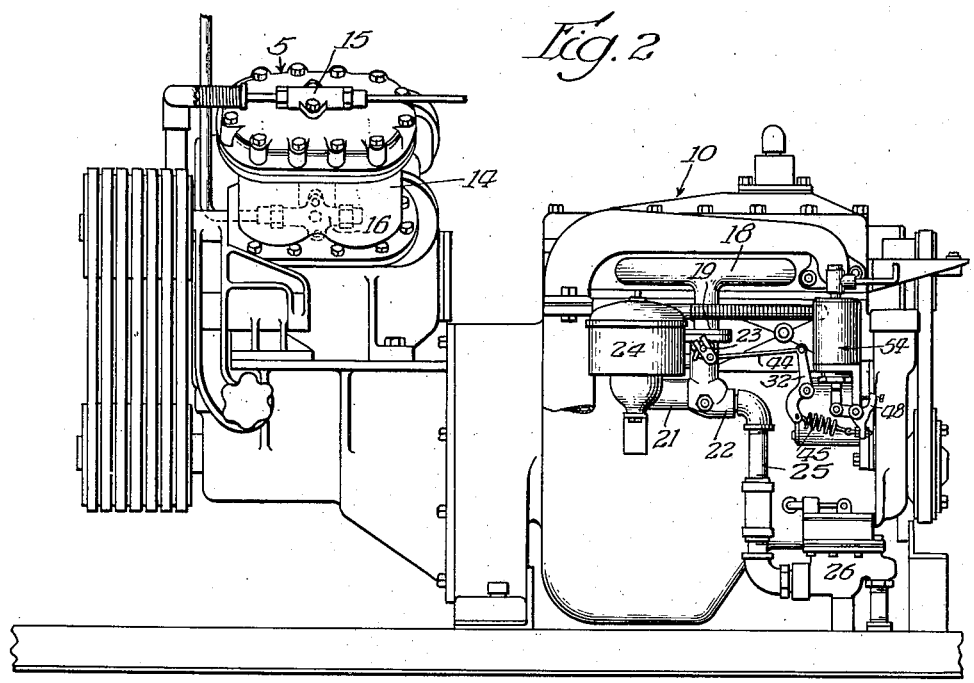

2,213,654

UNITED STATES PATENT OFFICE 2,213,654

REFRIGERATING APPARATUS

Lee W. Melcher, Waukesha, Wis., assignor to Waukesha Motor Company, Waukesha, Wis., a corporation of Wisconsin Application August 3, 1937, Serial No. 157,127

3 Claims. (Cl. 62—4)

The present invention relates generally to refrigerating apparatus. More particularly the invention relates to that type of refrigerating apparatus which is designed for use in conditioning or cooling air in an inclosed space such, for example, as a compartment or room in a building or railway car, and comprises a compressor, an evaporator or cooling coil in a blower equipped system for effecting constant circulation of air in the inclosed space as well as introducing outside or fresh air into such space, an expansion valve at the inlet side of the evaporator, a high pressure refrigerant line leading from the compressor to the expansion valve and including a condenser for the refrigerant and a receiver between the condenser and the expansion valve, a low pressure refrigerant line leading from the outlet side of the evaporator back to the compressor, and an internal combustion engine for driving the compressor.

In an apparatus of this type it has heretofore been customary to employ a governor for limiting or holding the compressor driving internal combustion engine to a fixed or predetermined maximum speed. It has also been customary to employ a thermostat for controlling the engine so that it starts when the temperature of the space to be cooled rises to a predetermined point, and stops when the temperature of the air in such space drops to a predetermined point. In practice it has been found that although a refrigerating apparatus employing a governor and thermostat fulfills its intended purpose as far as effecting cooling of the air in the inclosed space is concerned, it is subject to several objections. In the first place there is a constant starting and stopping of the engine during operation of the apparatus with the result that the engine is thus subjected to severe wear and strain. Secondly, the humidity of the air in the inclosed space to be cooled does not remain constant because when the apparatus is at rest, that is, when the engine is shut off and the flow of refrigerant to the evaporator thus ceases there is no dehumidification of the outside or fresh air entering the space by way of the system.

One object of the invention is to provide a refrigerating apparatus of the type under consideration which is an improvement upon previously designed apparatus of the same general character and is not subject to the foregoing objections by reason of the fact that it includes a control device whereby the engine instead of operating at its maximum speed until the air in the inclosed space and circulating system reaches its low temperature and then stopping, is substantially cut down in speed or modulated as the air in the space and system approaches its low temperature to the end that the apparatus as a whole operates at a reduced capacity and thus continues to operate over a comparatively long period of time and to produce substantially continuous cooling of the air in the system and dehumidification of the outside or fresh air entering the inclosed space by way of the system.

Another object of the invention is to provide a refrigerating apparatus of the last mentioned character in which the control device operates in response to changes or variations of the refrigerant resulting from load changes of the apparatus, and operates automatically when the load of the apparatus increases as the result of greater cooling demand or heat absorption on the part of the evaporator, to increase the speed of the compressor driven engine and thus cause the apparatus to operate at greater capacity.

A further object of the invention is to provide a refrigerating apparatus of the type and character under consideration in which the control device is applied to the spring of the governor for the engine and includes a collapsible bellows or diaphragm in a chamber which is connected by way of a pipe to the low pressure refrigerant line leading from the outlet side of the evaporator to the compressor.

A still further object of the invention is to provide an engine driven compresor type of refrigerating apparatus which is generally of new and improved construction and design and not only is extremely efficient but also economical as far as operation is concerned.

Other objects of the invention and the various advantages and characteristics of the present refrigerating apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a side elevational view of the compressor and engine of the apparatus;

Figure 1:
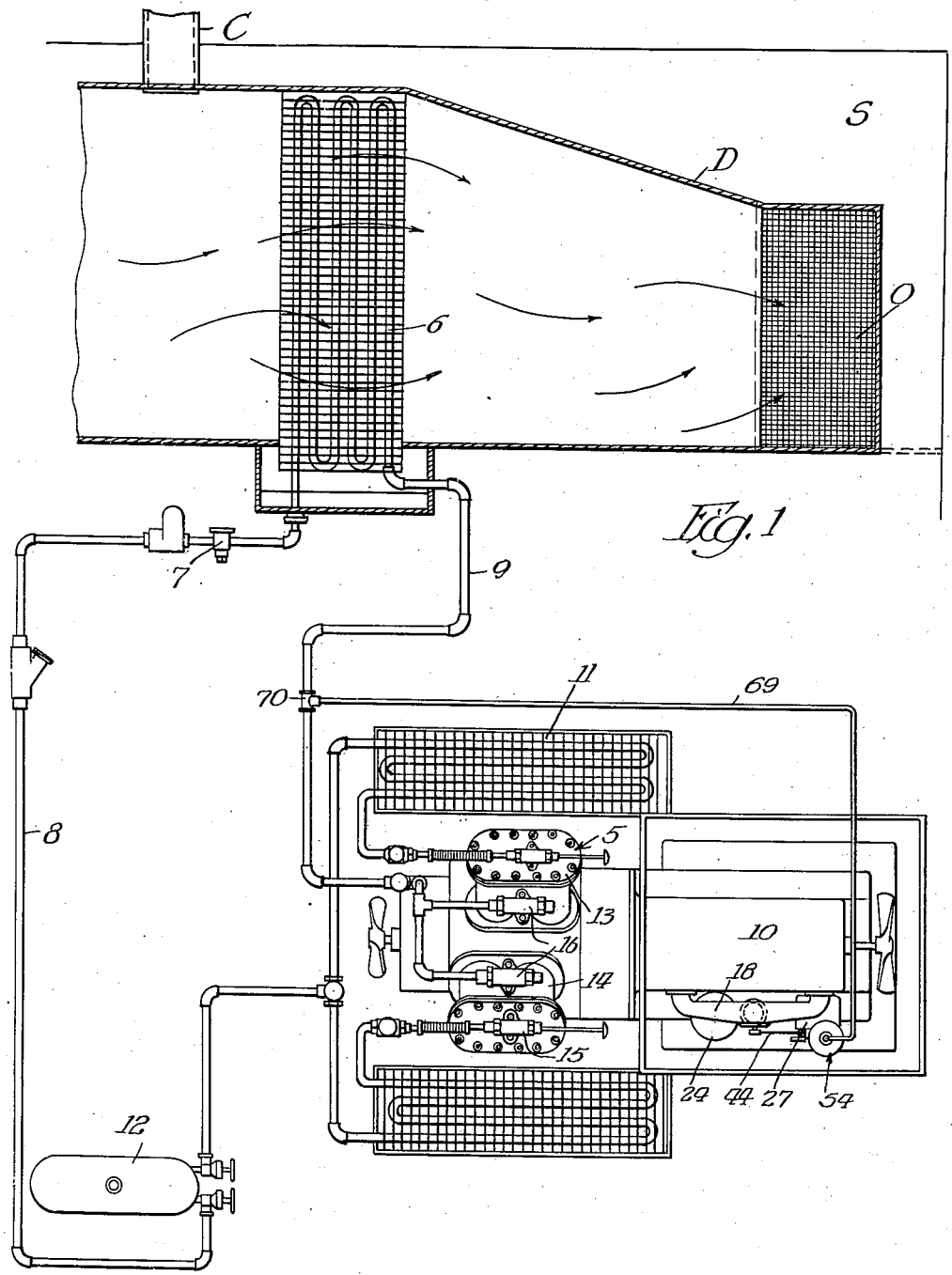
Figure 1 is a schematic or diagrammatic view of a refrigerating apparatus embodying the invention.

Figure 3 is a sectional view of the automatic control device for cutting down or modulating the speed of the compressor driving engine when the pressure of the refrigerant drops as a result of decrease in the load of the apparatus, illustrating in detail the construction and design of the device and the manner in which it is connected to the spring of the engine governor for speed control purposes; and Figure 4 is a sectional view of the governor for limiting or holding the engine to a fixed or predetermined maximum speed.

The refrigerating apparatus which is shown in the drawings constitutes the preferred embodiment of the invention. It is designed primarily for conditioning or cooling air in an inclosed space S having a duct D for circulating air therethrough. The duct D embodies an air inlet at one end thereof and a screened air outlet O at its other end and embodies a motor driven blower (not shown) which serves during operation thereof to draw air from the space S into the inlet end of the duct and to force such air through the duct and thence back to the inclosed space by way of the screened outlet O. A small outside or fresh air conduit C leads into the duct D and serves to introduce a small amount of fresh air into the duct in order to freshen the recirculated air in the space S. The duct D and the conduit C constitute a system for effecting circulation of air in the inclosed space S in connection with air conditioning of such space. The refrigerating apparatus is adapted during operation thereof to cool or chill as well as dehumidify the air as it passes through the space S and comprises a compressor 5, an evaporator 6, an expansion valve 7, a high pressure refrigerant line 8, a low pressure refrigerant line 9, and an internal combustion engine 10, for driving the compressor. The high pressure refrigerant line 8 leads from the compressor to the expansion valve 7 and includes a pair of air cooled condensers 11 and a receiver 12. The condensers serve to condense or liquify the refrigerant after the latter is compressed by the compressor and the receiver is disposed between the condensers and the expansion valve 7 and operates as a storage tank or receptacle for the liquified refrigerant. The low pressure refrigerant line 9 constitutes the refrigerant return line and leads from the evaporator 6 back to the compressor 5. The compressor 5 is of standard or conventional design and comprises a pair of cylinders 14 at the other side. The two pairs of cylinders 13 at one side thereof and a pair of cylinders are arranged in V-formation, as shown in Figure 1, and have therein crank shaft operated pistons (not shown). During drive of the compressor by the engine 10 the pistons in the two pairs of cylinders operate to draw the refrigerant from the low pressure refrigerant line 9 and to compress it and force it in gaseous form into the inlet end of the high pressure refrigerant line 8. Such end of the line 8 includes a pair of fittings 15 which fit on the top portions of and receive the compressed refrigerant from the compressor cylinders 13 and 14, respectively. From the fittings 15 the compressed refrigerant flows through the condensers 11 and then in liquified form passes to the receiver 12. The evaporator 6 is in the form of a coil of pipe and, as shown in Figure 1, extends transversely across the duct D at a point between the outside fresh air or inlet conduit C and the screened outlet O. The expansion valve 7 is connected to the inlet side of the evaporator and is attached to the discharge end of the high pressure refrigerant line 9. Liquified refrigerant flows from the receiver 12 through the expansion valve 7 and expands as it passes through the evaporator 6. As a result of expansion of the refrigerant in the coil, the coil is cooled and serves to chill and dehumidify the air in transit through the duct D. The low pressure refrigerant line 9 leads from the outlet side of the evaporator, as hereinbefore described, and is provided at its discharge end with a pair of inlet fittings 16. These fittings are secured to the side portions of the compressor cylinders 13 and 14 and serve to introduce the spent refrigerant into the compressor cylinders so that it is again compressed.

The internal combustion engine 10 is longitudinally aligned with the compressor 5 and has one end of its crank shaft connected by a V-belt drive to the crank shaft of the compressor. Fuel in the form of a mixture of air and gas is delivered to the engine by way of a carburetor 17 and an intake manifold 18. The intake manifold is connected to one side of the cylinder block of the engine and has an inlet nipple 19. The carburetor 17 is connected to this nipple and has an air inlet 21, a gas inlet 22, and a throttle valve 23. The air inlet 21 has an air strainer 24 at its outer end and operates to deliver air into the carburetor for mixture with the gas. The gas inlet is positioned opposite to the air inlet 21 and is connected to receive gas from a container (not shown) by way of a pipe 25 having a combined regulator and automatic shut off 26 therein. The throttle valve 23 serves to control the speed of the engine by regulating the amount of fuel passing into the cylinders of the engine via the manifold 18 and is automatically actuated or shifted for speed controlling purposes by means of a governor 27. This governor is mounted on the engine 10 in opposed relation to the air strainer 24 and the carburetor air inlet 21 and consists of a housing 28, a drive shaft 29, a plurality of weights 30, a shift plate 31, and a lever 32. The housing 28 is substantially cylindrical and extends horizontally. It is suitably fixed to the engine and has a cover closed chamber 33 therein. The shaft 29 is journaled in a bearing 34 in one end of the housing and is provided at its outer end with a pinion 35. The latter is adapted to mesh with an engine driven gear (not shown) so that the shaft 29 is driven by the engine. The other or inner end of the shaft 29 projects into the chamber 33 and has mounted thereon a weight support 36 and a flanged sleeve 37. The weight support 36 is keyed or otherwise fixedly secured to rotate with the shaft 29 and carries hinge pins 38. The weights 30 are mounted on these pins so that during drive of the shaft 29 they are permitted to swing or fly outwards in response to centrifugal force. They are disposed in the chamber 33 and have inwardly extending legs 39 which abut against the flange of the sleeve 37 and operate in response to outward movement of the weights to shift the sleeve 37 axially away from the pinion 35. The sleeve is slidably mounted on the inner end of the shaft 29 and embodies in addition to the leg engaged flange a disk-like head 40. The shift plate 31 is aligned with and spaced a small distance from the head 40 and is pivotally connected to one end of an arm 41. This arm is disposed in the chamber 33 in the governor housing 28 and is keyed or otherwise fixedly secured at its other end to a horizontally extending rock shaft 42 which extends through and is journaled in opposed bearings in the side wall of the cylindrical governor housing 28. A ball bearing 43 in the form of an annular retainer and a series of steel balls, is disposed between the shift plate 31 and the disk-like head 40 on the sleeve 37 and operates in response to shift of the sleeve by the weights 30 to shift the plate 31 so that it rocks the shaft 42 in one direction. The lever 32 is fixed to one end of the shaft 42 so that it rocks therewith. A throttle rod 44 extends between and is pivotally connected to the throttle valve of the carburetor 17 and the distal end of the lever 32. When the shaft 42 is rocked as a result of outward movement of the weights of the governor the lever 32 swings in one direction and operates through the medium of the throttle rod 44 to close the throttle valve so that it operates to cut down or retard the speed of the engine. A tension spring 45 serves to urge the throttle valve into its open position and to restrain or oppose outward movement of the weights 30 of the governor. This spring is connected at one end thereof to a C-shaped arm 46 which is formed integrally with, and extends radially from, the hub portion of the lever 32. The other end of the spring is anchored or attached by way of an eye-bolt 47 to a bell crank 48. The latter, as shown in Figure 3, is pivotally connected by way of a horizontal pivot stud 49 to a depending bracket 50 and embodies a downwardly extending substantially vertical arm 51, and a horizontally extending arm 52. The eye-bolt 47 extends through the distal end of the arm 51 and is provided on opposite sides of said arm with nuts 53 whereby it may be adjusted longitudinally in connection with adjustment of the spring 45. By adjusting the spring 45 the governor may be set so as to limit or hold the engine to a fixed or predetermined maximum speed. When the engine is rotating at such speed the weights 30 are held against outward movement by the action of the spring 45. If, for any reason, there is a tendency of the engine to increase in speed beyond the predetermined maximum the weights swing outwards against the force of the spring 45 and through the medium of the sleeve 37, the shift plate 31, and the arm 41, rotate the rock shaft 42 so that it together with the lever 32 and the throttle rod 44 closes to a certain extent the throttle valve and thus slows down the speed of the engine. The spring 45 operates, as hereinbefore described, to hold the throttle valve in proper position and to maintain the engine at its predetermined or maximum speed and so controls the governor that the latter is brought into play and operates automatically to close the throttle valve when there is any tendency of the engine to acquire an abnormal speed. By manipulating the nuts 53 on the eye-bolt 47 the tension of the spring 45 may be adjusted so that it together with the other parts of the governor hold or limit the engine to any desired maximum speed.

In order to cut down or modulate the engine and thus reduce the capacity of the apparatus when the load decreases as the result of the air traveling through the duct D being at substantially the proper low temperature, a control device 54 is provided. This device operates in response to fluctuation or variation in the pressure of the refrigerant in the low pressure line 9 and is associated with and works through the medium of the governor 27. It is positioned above the governor housing 28 and comprises as the main parts thereof a vertically extending cylindrical casing 55, a stem 56, and a collapsible bellows 57. The casing 55 comprises a cylindrical side wall 58, a top wall 59 and a bottom wall 60 and forms an enclosure for the bellows 57. The top wall 59 is removably connected to the upper end of the side wall 58 by a screw thread connection 61 and has an internally threaded hole 62 in the central portion thereof. The bottom wall 60 is removably secured to the lower end of the side wall 58 by a screw thread connection and has an upstanding integral sleeve-like extension 63 and a central internally threaded hole 64. The sleeve-like element 63 is spaced inwardly from the side wall 58 and terminates a small distance beneath the top wall 59 of the casing 55. The stem 56 extends vertically through and is spaced inwardly from the sleeve-like element 63 and is mounted for vertical sliding movement in a screw plug 65. This plug fits within the internally threaded hole 64 in the bottom wall of the casing 55 and is provided at its lower end and exteriorly of said bottom wall 60 with a polygonal head whereby it may be turned by a wrench or a similar turning tool when it is desired to shift it axially. The lower end of the stem 57 is pivotally connected to the outer or distal end of the horizontally extending arm 52 of the bell crank 48 so that the stem operates in response to vertical sliding thereof to rotate the bell crank and thus vary the tension of the spring 45. The upper end of the stem is provided with an enlarged disk-like head 66 which is disposed between the top wall 59 and the upper end of the sleeve-like element 63 and is of slightly greater diameter than the element, as shown in Figure 3. The collapsible bellows 57 is cylindrical and fits loosely between the side wall 58 of the casing 55 and the sleeve-like extension 63. The upper end of the bellows is fixed to and maintained in sealed relation with the marginal portion of the enlarged head 66 at the upper end of the stem 56 and the lower end of the bellows is soldered or otherwise connected in sealed relation to the bottom wall 60 of the casing 55. The bellows is imperforate with the result that the space on the outside, that is, the space between the bellows and the side wall 58 of the casing 55 is closed with respect to the space on the inside of the bellows. The first mentioned space is connected by a stub pipe 67, a fitting 68, a tube 69, and a fitting 70 to receive refrigerant from the low pressure refrigerant line 9 so that the bellows is subject to fluctuation or variation in the pressure of the spent refrigerant. The stub pipe 67 extends vertically and its lower end embodies an external screw thread and fits within the internally threaded hole 62 in the top wall 59. The fitting 68 is in the form of a T and embodies three branches, one of which is connected to the upper end of the pipe 67, and another of which is either closed by a plug or has a service shut-off valve (not shown) applied thereto. The third branch of the fitting 68 is connected to one end of the tube 69. The other end of the tube is connected by way of the fitting 70 to the line 9. When the apparatus is under full load, the refrigerant in the line 9 is under comparatively high pressure and hence tends to collapse the bellows 57. When the load of the apparatus decreases as a result of but a small amount of heat absorption on the part of the evaporator 6, the pressure of refrigerant in the line 9 decreases and hence there is a tendency for the bellows to expand. A compression spring 72 surrounds the upper end of the stem 56 and extends between the enlarged head 66 and the screw plug 65. This compression spring may, by manipulation of the screw plug 65, be adjusted as far as compression is concerned and serves to urge the bellows into its fully expanded position. When the pressure of the spent refrigerant reaches a maximum as a result of the apparatus being under normal or full load condition the bellows collapses and causes the stem 56 to slide downwards and maintain the bell crank 48 in its normal position wherein a third arm 73 thereof with a stop screw 74 at its outer end is in contacting or abutting relation with the bracket 50. When the bell crank is in its normal position as the result of the pressure of the spent refrigerant holding the bellows in its collapsed position against the force of the spring 72 the engine operates at full speed under the normal action of the governor 27. When the pressure of the spent refrigerant drops as the result of a decrease in load conditions the spring 72 operates to extend the bellows and shift upwards the stem 56. In response to upward shift of the stem 56 the bell crank 48 is swung in such manner that the arm 51 thereof moves towards the arm 46 and thus reduces the tension of the spring 45. As soon as the tension of the spring 45 becomes reduced the weights 30 fly outwards and through the medium of the various operating parts of the governor and the throttle rod 44 close to a limited extent the throttle valve 23 and thus cut down or modulate the speed of the engine. From the foregoing it is manifest that by way of the action of the control device 54 the speed of the motor is automatically cut down or modulated in response to a decrease in load condition. When the load increases to normal the bell crank 48 is shifted back to its normal position by downward shift of the stem 56 and places the tension spring 45 under its normal tension. As soon as the spring 45 is under such tension the governor operates in its normal manner and the weights 30, as the result of the action of the spring, are caused to swing inwards. In response to inward movement of the weights the rock shaft 42 is released so that the spring operates through the medium of the lever 32 and the throttle rod 44 to open the throttle valve 23. Upon opening of the throttle valve the engine increases in speed and the apparatus thus operates at full capacity. The control device 54 operates automatically when the pressure of the spent refrigerant in the suction or low pressure line 9 drops as the result of decreased load conditions to lessen the tension of the spring 45 so that the governor through the medium of the weights 30 closes to a certain extent the throttle valve and thus reduces the speed of the engine so that the apparatus operates at reduced capacity. By adjusting the compression of the spring 72 of the control device the control device may be set so that the throttle valve 23 of the carburetor is swung into its partially closed position when the pressure of the spent refrigerant in the suction or low pressure line 9 drops to any predetermined point. When the compression of the spring 72 is increased by tightening the screw 65 a small drop in the pressure of the spent refrigerant in the line 9 results in upward shift of the stem 56 and the resultant slowing down or modulation of the engine 10. When the plug 65 is loosened so as to decrease the compression of the spring 72 there must be a comparatively large drop in the pressure of the spent refrigerant in the line 9 before the spring is able to overcome the pressure in the casing 55 and shift the stem 56 upwards so as to reduce or modulate the speed of the engine. The bracket 50 for the bell crank 48 is formed integrally with and depends from the bottom wall 60 of the casing of the control device 54.

Assuming that the governor 27 is set to limit or restrict the engine 11 to a maximum speed of 1200 R. P. M. and the control device 54 is set so that when the pressure of the spent refrigerant in the line 9 drops from its normal pressure of say 35 pounds per square inch to 15 pounds per square inch as the result of a 50% decrease in load conditions, it reduces the speed of the engine to say 600 R. P. M., the operation of the apparatus is as follows: During normal load conditions the apparatus runs at full capacity and the speed of the engine 10 is limited or restricted to 1200 R. P. M. as the result of the operation of the governor 27. The latter, as hereinbefore pointed out in response to an increase in speed of the engine, closes to a small degree or extent the throttle valve and thus reduces the speed of the engine. As soon as the load conditions decrease to the point where there is only a suction pressure of 15 pounds per square inch in the suction or low pressure line 9, the spring 72 in the sleeve-like extension 63 of the bottom wall of the casing of the control device 54 overcomes the pressure of the refrigerant in the casing and expands the bellows and shifts or slides upwards the stem 56. Upon upward shift of the stem the bell crank 48 is rotated so as to bring the arm 48 thereof nearer the arm 46 and thus to reduce the tension of the spring 45. As soon as the tension of the spring 45 is reduced, the weights 30 move outwards and shift axially the sleeve 37 and the shift plate 31. Shift of the plate 31 operates through the medium of the arm 41 to rock the shaft 42 so that it, through the medium of the lever 32 and the throttle rod 44, partially closes the throttle valve. Upon partial closing of the throttle valve the engine drops in speed and hence the capacity of the apparatus is reduced. As soon as load conditions increase as the result of greater heat absorption on the part of the evaporator 6, the suction pressure of the spent refrigerant in the line 9 rises. As soon as the spent refrigerant increases in pressure to the point where it is able to overcome the compression of the spring 72 the bellows 57 collapses and the stem 56 is slid downwards in response to downward slide or shift of the stem and the bell crank 48 is shifted into its normal position and the tension of the spring 45 is increased to normal. Upon increase of the tension of the spring 45, the weights 30 move inwards, as hereinbefore described, and the lever 32 and throttle rod 44 are shifted so as to open the throttle valve. As soon as the throttle valve is open the engine increases in speed and causes the apparatus to operate at full or normal capacity.

The herein described refrigerating apparatus is extremely efficient as far as operation is concerned and contemplates even though under control of a thermostat substantially continuous drive or operation of the engine. As the result of the fact that the engine is driven substantially continuously maximum economy is obtained and there is but a small amount of wear and strain. In addition there is substantially continuous dehumidification of the circulated air.

Whereas the refrigerating apparatus has been described as being adapted primarily for use in connection with air cooling or conditioning it is to be understood that it may be used in other capacities. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. A refrigerating apparatus comprising in combination a refrigerant compressor, an evaporator, high and low pressure refrigerant lines leading one from the compressor to the evaporator and the other from the evaporator to the compressor, an internal combustion engine connected to drive the compressor, a spring type governor for limiting the engine to a predetermined maximum speed during operation of the apparatus at full capacity, and means actuated by the pressure of the refrigerant in the low pressure line only for varying the spring of the governor in such manner that during a drop in pressure of said refrigerant due to lessened load conditions the governor lessens or modulates the speed of the engine and thus causes the apparatus to operate at a lower capacity.

2. A refrigerating apparatus comprising in combination a refrigerant compressor, an evaporator, high and low pressure refrigerant lines leading one from the compressor to the evaporator and the other from the evaporator to the compressor, an internal combustion engine connected to drive the compressor and having a carburetor with a throttle valve, a governor with a spring for resisting the fly weights thereof, connected to the throttle valve and adapted so to control the latter as to limit the engine to a predetermined maximum speed during operation of the apparatus at full capacity, and means actuated by the pressure of the refrigerant in the low pressure line only for automatically varying the spring of the governor in such manner that during a drop in pressure of the spent refrigerant due to lessened load conditions the governor operates partially to close the throttle valve and thus reduces or modulates the speed of the engine and causes the apparatus to operate at a lower capacity.

3. A refrigerating apparatus comprising a refrigerant compressor, an evaporator, high and low pressure refrigerant lines leading one from the compressor to the evaporator and the other from the evaporator to the compressor, an internal combustion engine connected to drive the compressor and having a carburetor with a throttle valve, a flyweight type governor with a spring for resisting the flyweights thereof, connected for drive by the engine and having a valve shifting connection between it and the throttle valve whereby it operates partially to close the valve upon the flyweights overcoming said spring, and means for automatically decreasing the loading of the governor spring when the pressure of the refrigerant in one of the lines drops, and increasing the loading of said spring when the pressure of the refrigerant in said one line increases.

LEE W. MELCHER.